Dec. 31, 1946.      R. J. POMEROY      2,413,376
DRAFTING MACHINE
Filed May 9, 1944          8 Sheets-Sheet 1

Fig. 1.

INVENTOR.
ROY J. POMEROY,
BY

ATTORNEY.

INVENTOR.
ROY J. POMEROY,
BY

ATTORNEY.

Dec. 31, 1946.　　　R. J. POMEROY　　　2,413,376
DRAFTING MACHINE
Filed May 9, 1944　　　8 Sheets-Sheet 4

INVENTOR.
ROY J. POMEROY,
BY
ATTORNEY.

INVENTOR.
ROY J. POMEROY,
BY
ATTORNEY.

Dec. 31, 1946. R. J. POMEROY 2,413,376
DRAFTING MACHINE
Filed May 9, 1944 8 Sheets-Sheet 8

INVENTOR.
Roy J. POMEROY,
BY
ATTORNEY.

Patented Dec. 31, 1946

2,413,376

UNITED STATES PATENT OFFICE 2,413,376

DRAFTING MACHINE

Roy J. Pomeroy, Los Angeles, Calif., assignor, by mesne assignments, of one-sixth to Mildred Hirshstein, one-sixth to Ruth R. Newman, and one-sixth to M. J. Hirshstein, trustee for the benefit of Pearl Hirshstein, all of Cleveland, Ohio Application May 9, 1944, Serial No. 534,712

25 Claims. (Cl. 33—77)

This invention relates to geometrical instruments and more particularly to a drafting machine for plotting perspective views.

An object of my invention is to provide a perspective drawing machine whereby perspective views can be plotted easily and accurately.

A more detailed object is to provide a perspective drawing machine adapted to be mounted in cooperative association with a drawing board in such a manner that data ascertained from orthographic projection of an object can be interpreted with the greatest ease and with extreme accuracy to enable the operator to plot a perspective view of that object with both accuracy and dispatch.

A further object is to provide a perspective drawing machine capable of being used to draw "stereoscopic pairs," which can be viewed with any suitable stereoscopic viewing device for the purpose of studying the device or object revealed in three dimensions.

A further object is the provision of a perspective drawing machine of the general character indicated constructed in accordance with relatively simple design and composed of a small number of parts which are of rugged and relatively inexpensive construction and yet which can be relied upon to serve accurately and efficiently to carry out the functions for which it has been designed.

The invention possesses other objects and valuable features, some of which with those enumerated, will be set forth in the following description of the preferred embodiments of my invention illustrated in the drawings accompanying and forming part of the specification. It is to be understood that I do not limit myself to the showing made by the said drawings and description, as I may adopt variations of the preferred embodiments within the scope of my invention as defined in the claims.

Referring to the drawings.

Figure 7:
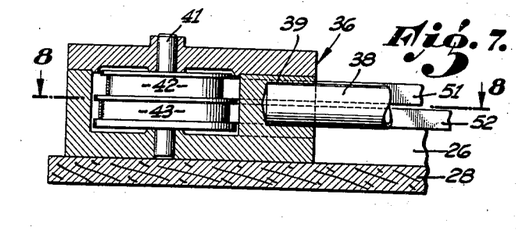
Fig. 7 is a detailed view of one of the anchoring blocks whereby the entire drafting machine is mounted, taken in transverse vertical section upon the lines 7—7 of Figs. 1 and 8 with the direction of view as indicated.
Figure 8:
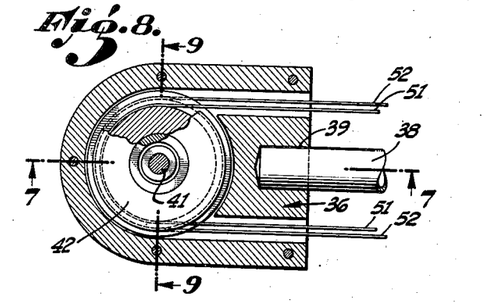
Fig. 8 is a horizontal sectional view taken upon the line 8—8 of Fig. 7 with the direction of view as indicated.

Referring first to that modification of my invention which is illustrated in Figs. 1 to 10, inclusive, a pair of upper and lower drafting boards 26 and 27 are rigidly mounted on any suitable support such as a drafting table 28, preferably with their adjacent edges in parallel relation and vertically separated far enough to provide a horizontally or transversely extending space 29 therebetween. Each of these drafting boards 26 and 27 provides a drawing area upon which sheets of drawing paper 31 and 32, respectively, can be secured as by thumb tacks 33 and 34, respectively. The space 29 accommodates a pair of anchoring blocks 36 and 37 which are separated from each other far enough to accommodate a guide bar 38 extending therebetween. As best shown in Figs. 7 and 8, each end of the guide bar 38 is seated within a complementary and closely fitted socket 39 in the associated head 36, 37 for the dual purpose of supporting the guide bar 38 rigidly in position extending transversely with respect to the drawing areas and also to maintain the anchoring blocks 36, 37 rigidly at their selected spacing.

Figure 9:
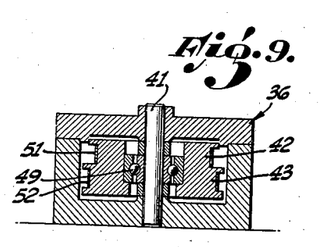
Fig. 9 is a vertical sectional view, the plane of section being indicated by lines 9—9 of Fig. 8 and the direction of view by the arrows.
Figure 10:
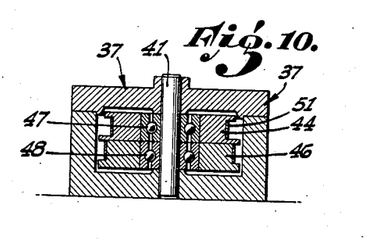
Fig. 10 is a view similar to Fig. 9 but showing the opposite anchoring block; hence, this view may be considered a sectional view taken upon the line 10—10 of Fig. 1 with the direction of view as indicated.

Each of the anchoring blocks 36, 37 carries a vertically disposed pin 41, upon each of which a pair of pulley wheels is journaled. As best shown in Fig. 9, the pulley wheels 42 and 43 associated with the anchoring block 36 are rigidly joined together, preferably integrally, whereas the pulley wheels 44 and 46 associated with the anchoring block 37 are separate from each other so that each is enabled to rotate independently of the other. Toward this end the pulley wheels 44 and 46 are each provided with an anti-friction bearing 47, 48, respectively, to mount them upon the associated pin 41; whereas in the case of the pulley wheels 42 and 43 which are integrally united, a single bearing 49 will suffice to mount them on their associated pin 41. The pulley wheels of each pair are of different diameter from each other, the upper pulleys 42 and 44 preferably being of smaller diameter than the lower pulleys 43 and 46. A convenient ratio is 10 to 9, as will appear more fully hereinafter. The smaller pulleys 42 and 44 are preferably, but not necessarily, each of the same diameter and are arranged in planar alignment so that they can carry a belt 51 of flexible metal, stainless steel being suitable for this use because of its relatively high resistance to stretching when subjected to tension. Similarly, the larger pulleys 43 and 46 on opposite sides of the drafting machine, also preferably, but not necessarily, are each of the same diameter and are in planar alignment so that they can receive a second flexible belt 52, also of some relatively unstretchable material. Since the pulleys 42 and 43 are rigidly interconnected, any motion of the belt 52 tending to rotate its pulleys 43 and 46 will be transmitted by the pulley 42 to the other belt 51 but because of the difference in the radii of the pulleys 42 and 43, the belt 51 will move at a lesser rate and consequently through a shorter distance.

Since the pulleys 44 and 46 are mounted upon their bearing pin 41 independently of each other, the necessity for extreme accuracy in sizing the pulleys 44 and 46 is obviated.

A carriage 56 is slidably mounted upon the guide rod 38 and is guided thereby in straight-line, reciprocatory movement in a transverse direction with respect to the drawing areas 31 and 32. Preferably this carriage comprises a pair of blocks 57 rigidly interconnected by forward and after bottom webs 58 and 59, respectively, so as to retain the two blocks 57 in a spaced relation. Axially aligned holes 61 are formed in the two blocks 57 through which the guide rod 38 extends. The parts are so proportioned and arranged that the guide rod 38 fits within the holes 61 with a sliding fit so as to assure accuracy of the straight line movement experienced by the carriage 56 upon the rod 38.

The lower run of the tape 52 is fastened to the carriage 56 so that any motion of the carriage 56 on its guide rod 38 will be transmitted to the tape 52. A convenient method of effecting this attachment is through the expedient of a set screw 62 threaded through the front edge of the web 58 from its extreme forward edge into a passageway 63 which is formed in the web 58 extending from the lateral edge 64 through a central opening 66 and in alignment with a similar passageway 67 at the opposite end of the web 58. One end 68 of the tape 52 is disposed within the passageway 63, whereas the other end 69 of the tape 52 is rove through the passageway 67, extended across the central opening 66 and also received within the passageway 68 so that by tightening the set screw 62 thereagainst, both ends 68 and 69 of the tape 52 can be anchored together so as to maintain tension in the entire tape 52, and at the same time anchor the carriage 56 to the tape 52 for simultaneous and coextensive movement therewith. Since the portion of the end 69 which extends between the two passageways 63 and 67 is unsupported, the tension in the tape 52 can easily be regulated by means of a second set screw 71, also threaded through the web 58 from its extreme forward edge and extending into the central opening 66 where it is provided with a pressure shoe 72 pressing against the unsupported portion of the tape 52 between the two passageways 63 and 67.

An upstanding flange 76 is formed on the after edge of the web 59, and a bearing plate 77 is secured to this flange as by screws 78. A bearing 79 carried by the plate 77 provides a pivotal support for an arm 81 which preferably comprises an upper transparent portion 82 and a lower metal portion 83, offset vertically from each other and rigidly interconnected by means of a stub shaft 84 revolubly seated within the bearing 79. Preferably the transparent portion 82 is releasably secured to the stub shaft 84 as by means of a screw 86 connecting the transparent portion 82 to a plate 87 which is permanently fastened upon the lower end of the stub shaft 84. The lower end 83 of the arm 81 is preferably releasably secured to the upper end of the stub shaft 84 as by a set screw 88, this construction making for ease of assembly inasmuch as the stub shaft 84 can be slipped into the bearing 79 from below before the lower portion 83 of the arm 81 is secured thereto. The upper transparent portion 82 may conveniently be composed of Celluloid, transparent plastic, or the like, so that when it extends over subject matter appearing upon the drawing area 31, it does not operate to obscure the user's view of that subject matter. The transparent portion 82 is provided with a hairline 89 extending longitudinally thereof and accurately intersecting the axis of the stub shaft 84.

Figure 5:
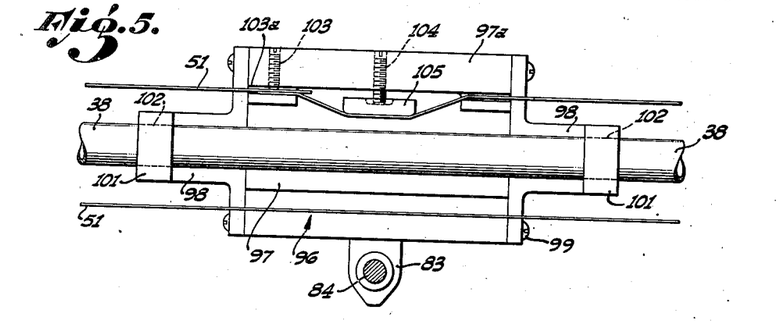
Fig. 5 is an underneath plan view of the hairline-actuating head, which may be considered a horizontal sectional view taken on line 5—5 of Fig. 3 with the direction of view as indicated.
Figure 6:
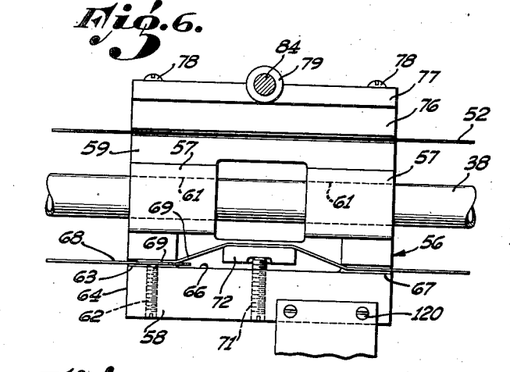
Fig. 6 is a top plan view of the straight edge-actuating carriage, which may be considered a horizontal sectional view taken from the line 6—6 of Fig. 5 with the direction of view as indicated.

Also mounted upon the guide rod 38 for straight-line, reciprocatory motion is head 96 which preferably has the form of a flat top plate 97 to each end of which a bracket 98 is rigidly secured, as by screws 99. Each bracket 98 has a downwardly extending terminal portion 101 and the two portions 101 of the brackets 98 are provided with axially aligned holes 102 within which the guide rod 38 is slidably fitted. The lower edge portion of the top plate 97 has a depending flange portion 97a which is slidably supported by the upper side of the web 58 of the carriage 56, while the upper edge portion of plate 97 is slidably supported by the flange 76 upstanding from carriage web 59 (see Fig. 4). The brackets 98 are of such length that the space between the downwardly extending portions 101 thereof is materially greater than the overall length of the carriage 56, which is disposed therein, with the result that the carriage 56 and the head 96 are capable of movement along the rod 38 independently of each other. However, since the head 96 is firmly attached, as presently to be described, to the tape 51 which passes around the smaller pulleys 42 and 49, the ratio between the respective rates of movement of the head 96 and the carriage 56 will correspond to that between the respective diameters of the pulley wheels 42 and 43. Since the tape 51 to which the head 96 is attached passes around the small pulley 42 and the tape 52 to which the carriage is attached passes around the larger pulley 43, any movement of the carriage 56 upon its guide rod 38 will result in simultaneous movement of the head in the same direction but through a shorter distance. The lower run of tape 51 is attached to head 96 in a manner similar to the attachment of the lower run of the first mentioned tape to carriage 56. A set screw 103 in flange 97a extending from the outer surface of said flange to a tape passageway 103a formed in the flange engages the two ends of the tape and anchors them together and to the head. The tension in the tape is regulated by second set screw 104 and tape engaging pressure shoe 105 (Fig. 5).

Means are provided for connecting the lower end 83 of the hairline carrying arm 81 to the head 96 so that as the carriage 56 and the head 96 move along the guide rod 38 the arm 89 will be caused to rotate about the axis of its stub shaft 84, and since the head 96 to which the lower end of the arm 81 is connected is moving at a lesser rate than the carriage, the direction of rotation of the arm 81 will be that in which the upper end 82 of the arm 81 moves in the same direction as the carriage and at a greater rate. In other words, if the carriage 56 and head 96 move to the right as viewed in Fig. 1, say from the full line position to the broken line position on that figure, the transparent portion 82 of the arm 81 will rotate in clockwise direction to assume a position of angularity such as that also indicated in broken lines. For the purpose of providing this interconnection between the lower portion 83 of the arm 81 and the head 96, an elongated, longitudinally extending slot 106 is provided in the lower portion 83 of the arm, through which a pin 107 extends. A head 108 on the lower end of the pin 107 is slidably engaged within a T-shaped slot 109 in the upper face of the plate 97 of the head 96, this slot extending in a direction perpendicular to the direction of movement of the head. Although the lower, slotted portion 83 of the arm 81 closely overlies the upper face of the plate 97, a washer 110 is interposed therebetween, and preferably the under surface of this washer 110 is provided with a noncircular portion 111, extending downward into the narrower portion of the T-shaped slot 109 and slidably fitted thereto so that the washer 110 is free to reciprocate with respect to the plate 97 without being permitted to turn upon the pin 107. One side of the washer 110 is bevelled as indicated at 112 and preferably is provided with a suitable index mark (not shown) adapted to be read in cooperative association with calibrations 113 and indicia 114 on the upper surface of the plate 97 to position the pin 107 accurately in the exact portion of the slot 109 decided to meet requirements for any individual drafting problem as will be explained hereinbelow. Also engaged upon the pin 107, within the slot 106 of the arm 81 and resting upon the upper face of the washer 110, is a bushing 116, the length of which is slightly greater than the thickness of the portion 83 of the arm so that when the nut 117 which is threaded upon the upper end of the pin 107 is tightened, the nut 117 will exert pressure upon the bushing 116, which in turn will press the washer 110 down against the plate 97 while the tension imposed on the pin 107 by tightening the nut 117 will draw the head 108 upwards against the flanges which define the narrower portion of the T slot, thus clamping the pin 107 in fixed position to the plate 97 without, however, restricting the movement of the arm 81, which is thus left free to turn upon the bushing 116 and to partake of that extent of longitudinal sliding movement, which is coincident to the rotary motion of the arm 81 about the axis of the stub shaft 84.

A straightedge, preferably in the form of a rule 118 having a beveled working edge 119 is rigidly secured to the carriage 56 as by screws 120 threaded into the web 58. This rule extends downwards over the drawing area 32 from the carriage 56 accurately at 90° with respect to the direction of movement of the carriage and with its working edge 119 accurately in alignment with the axis of the stub shaft 84.

*Operation*

A method of hand plotting of a perspective view of an object, starting with a plan view, will now be described and thereafter will be described how the machine of the invention performs the same manipulations. Assume that we have the plan view 121 of Fig. 11, laid out in a desired aspect on the sheet 31, which has been fastened to the upper portion of a drafting board, sufficient space having been left below to accommodate the sheet of paper 32 or other medium on which the perspective drawing is to be made. A side elevational view 122 is first drawn by lateral projection from elevational view 121. A point S representing the station point is plotted in fixed position with respect to the views 121 and 122, a horizontal line 123 representing the location of the picture plane is drawn transversely with respect to the drawing board and between the views 121 and 122 and the station point S, and a vertical line 125 is drawn upwards from station point S. The relationship between the line 125 and the projected view 122 determines elevation at which the object to be depicted will be seen in the perspective, the line of intersection of the line 125 with the view 122 determining the eye-level in the final view. Obviously, the view 122 is to be plotted with this in mind. Then to draw a perspective view 124 of the object as it would appear to a person located at the station point S and viewing the object standing erect upon the plan view 121 with the edges of its base overlying the lines of Fig. 11, respectively, representing those edges, the following procedure is carried out.

Figure 11:
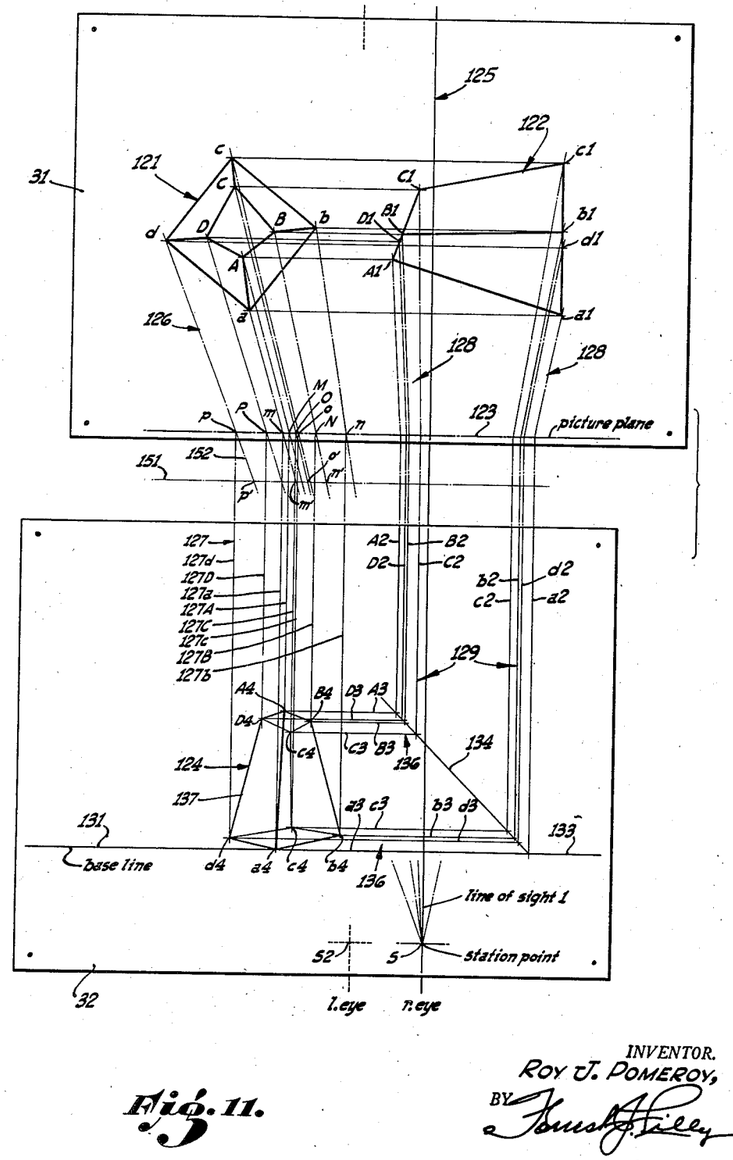
Fig. 11 is a schematic view indicating the different steps performed by my improved drafting machine in plotting a perspective view of an object.

Each of the significant points of the plan 121, as A, B, C and D defining the object's top and a, b, c and d defining the object's bottom, are connected to the station point S by a group of lines 126. Then a group 127 of vertical lines 127A, 127a, 127B, 127b, etc., are dropped perpendicularly with respect to the picture plane line 123, there being one such line from each point M, N, O and P and m, n, o and p where the lines of sight 126 pierce the picture plane line 123. In a similar manner lines of sight 128 are drawn from the significant points A1, B1, C1, D1, a1, b1, c1 and d1 to the station point S, and from the points of intersection of these lines of sight 128 with the picture plane line 123 a group 129 of vertical lines such as A2, a2, B2, b2, etc., are drawn downwards. It will be noted that the point a on the plan view 121 and a1 on the elevational view 122 represent the point on the base which is nearest the observer. Therefore, a horizontal line 131 is drawn across the sheet 32 upon which the perspective view 124 is being plotted; and the intersection of the line 131 with the vertical line 127 associated with the point a on the plan view 121, definitely locates the position on the sheet 32 for the point a4 representing in the perspective view 124 the point in the base of the object nearest the observer. The line 131 is extended horizontally across the sheet 32 to the point 133 of intersection with the vertical projection line a2 of the group of lines 129 which has been projected vertically downwards from the intersection of the corresponding line of sight 128 with the picture plane line 123. From this point 133 of intersection, a 45° line 134 is drawn to intersect all of the vertical lines 129; and from these points of intersection a group 136 of horizontal lines A3, a3, B3, b3, etc., are projected. Each of these horizontally projected lines of the group 136 intersects the vertically extending line of the group 127 from the corresponding point in the plan view 121 in a point which definitely locates the position in the perspective view 124 of the corresponding point of the object. That is to say, where the line A3 of the group of horizontal lines 136 intersects the vertical line 127A of the group of lines 127, the point A4 will definitely be located and this point A4 will represent in the perspective view 124 the same point on the object which is depicted in the plan view 121 at A and in the elevational view 122 at A1. All of the other significant points are similarly plotted as indicated at B4, C4, D4 and a4, b4, c4 and d4. Consequently, by interconnecting these plotted points with the appropriate boundary lines 137, an accurate perspective view of the object may be constructed.

Figure 1:
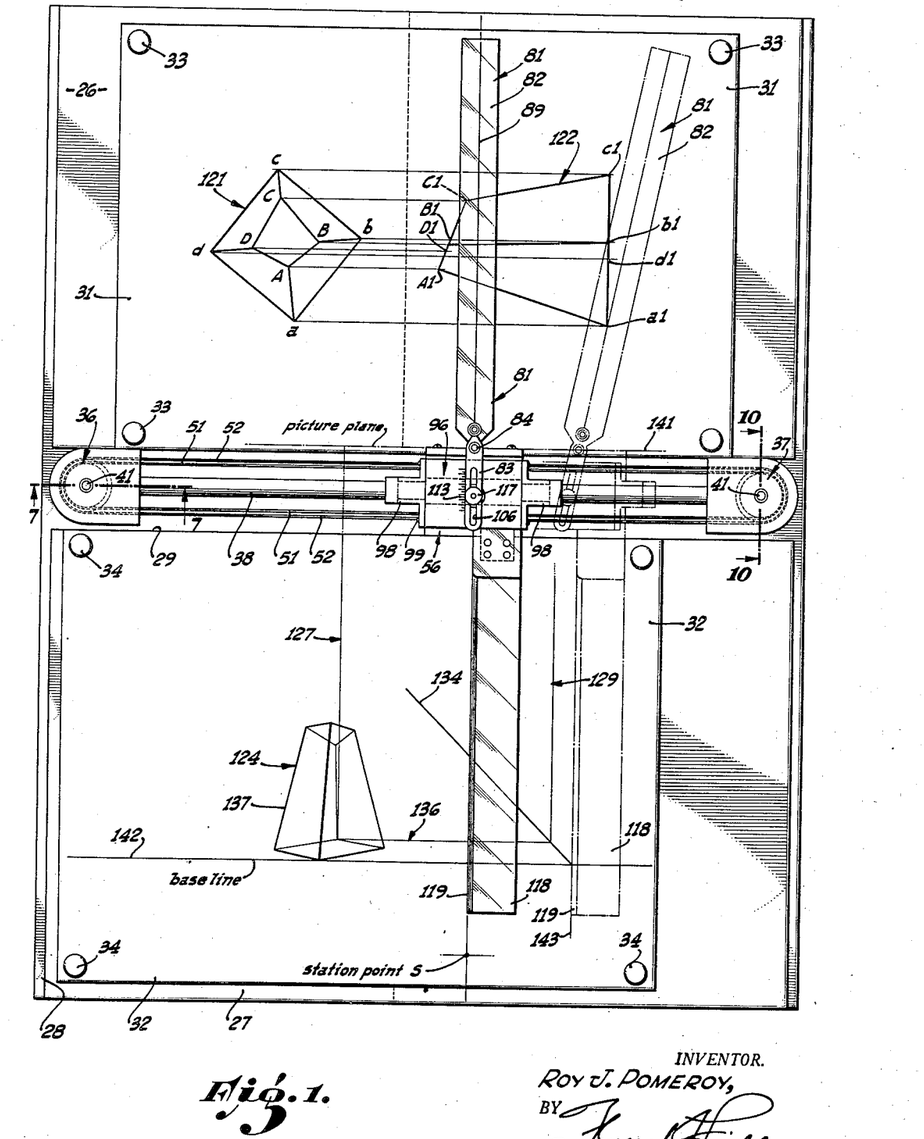
Fig. 1 is a top plan view of a perspective drawing machine incorporating the principles of the present invention.
Figure 2:
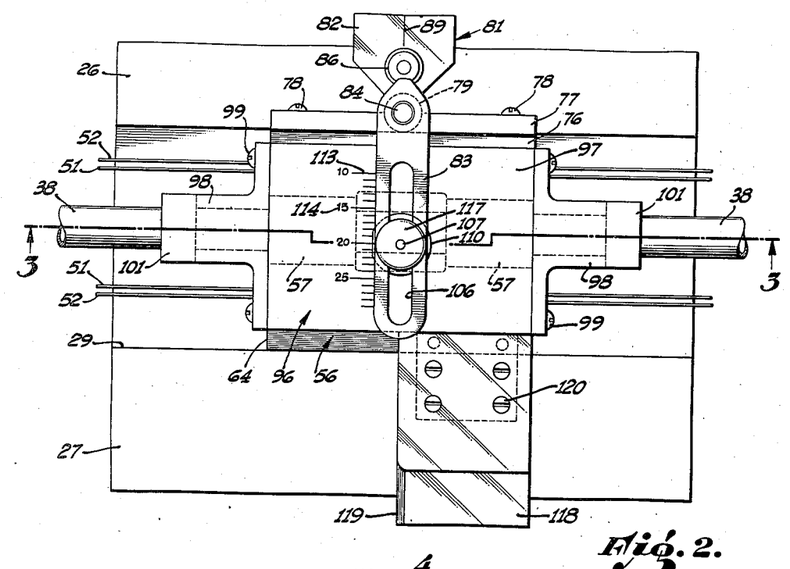
Fig. 2 is an enlarged detailed view of the straight edge and its actuating carriage, and of the hairline support and its actuating head of the drafting machine illustrated in Fig. 1, portions of the figure being broken away to reduce its size.
Figure 3:
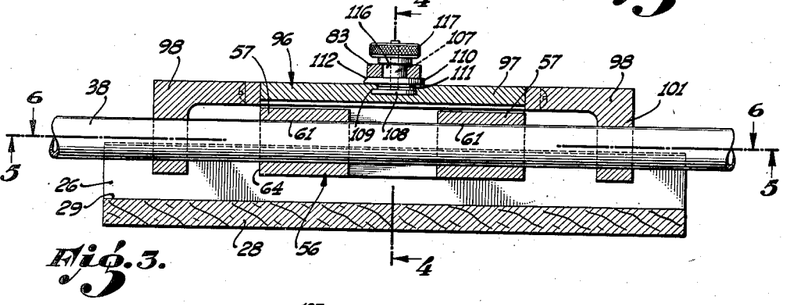
Fig. 3 is a transverse, vertical sectional view taken upon the line 3—3 of Fig. 2 with the direction of view as indicated.
Figure 4:
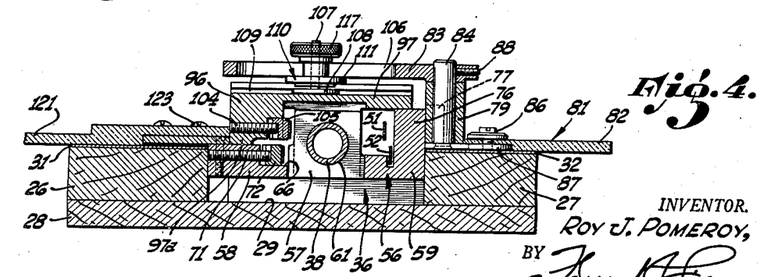
Fig. 4 is a longitudinal sectional view taken upon the line 4—4 of Fig. 3 with the direction of view as indicated.

The perspective drawing machine forming the subject matter of the present invention makes it possible to plot a perspective view of an object by the same method as that hereinabove described but considerably more easily inasmuch as the machine performs certain of the steps of the described method automatically. The method of using the drafting machine is as follows: As indicated in Fig. 1, the sheet 31, upon which the plan and elevational views 121 and 122, respectively, are already drawn, is mounted upon the upper drafting board 26 in position for the transparent arm 81 to move thereover. The blank sheet of drawing paper 32 is mounted upon the lower drawing board 27 in position for lines to be drawn thereupon along the straightedge 119. As the head 96 moves back and forth along its guide rod 38, the pivot pin 84 whereby the arm 81 is connected to the carriage 56 will move in a straight line transversely with respect to the drawing boards. The line of movement thus described by the axis of this pin 84 is indicated at 141 and represents the picture plane. However, this line does not have to be drawn since this is one of the steps which use of the machine makes unnecessary. The first step in plotting the perspective view 124 is to draw the base line 142 transversely across the sheet 32 and at selected position between its upper and lower edges. Then the carriage 56 is slid along its guide rod 38 until the hairline 89 meets the point a1 on the elevational view 122 which represents the point in the base of the object nearest the observer. The arm 81 carrying the hairline 89 is indicated in this position in broken lines in Fig. 1. With the arm 81 in this position, a vertical line 143 is drawn upon the paper 32 along the straightedge 119 to intersect the base line 142; and from the point of intersection of the lines 142 and 143, the 45° line 134 is drawn.

Thereafter, the carriage 56 is manipulated so as to cause the hairline 89 to meet each of the other significant points b1, c1 and A1, B1 and C1 in the elevational view 122 and a vertical line 129 is drawn along the straightedge 119 to intersect the 45° line 134 while the hairline is meeting each of these points. Then a line 136 is projected horizontally across the sheet 32 from each point of intersection between the lines 129 and the 45° line 134.

Then the carriage 56 is manipulated to make the hairline 89 intersect each of the significant points A, B, C and D and a, b, c and d, a vertical line 127 being drawn by means of the straightedge 119 for each of the positions of the arm 81 thus obtained. Then, just as in the manual method, the intersection of corresponding lines 127 and 136 will locate the corresponding point in the perspective view 124. When all the significant points have thus been plotted, the outline of the object can be completed by interconnecting the plotted points by the appropriate boundary lines 137, thus constructing a complete perspective view 124.

It is clear, therefore, that in order to show that the perspective drawing machine of the present invention operates in the manner described to construct a perspective view 124 which is accurate, it is necessary only to show that while the carriage 56 is being moved, the hairline 89 describes that kind of motion which results in preserving the alignment of the hairline 89 accurately with a given point S which point then will represent accurately the station point.

Because of the described manner of construction of my improved drafting machine, when the carriage 56 moves along its guide rod 38 the head 96 will move at a different rate, and the significant feature of the construction is that the ratio of the rate of movement of the head to the rate of movement of the carriage remains constant throughout their entire range of movement. If the diameters of the upper and lower pulleys are in the ratio of 9 to 10, as has been stated to be preferred, the speed ratio of the two tapes will also be in the ratio of 9 to 10. Since one part of the arm 81 is connected to the head 96 in such a manner that the extent of horizontal movement of that part of the arm 81 coincides exactly with the extent of movement of the head, whereas another part of the arm is pivoted to the carriage, the differential movement of the head and carriage will cause the arm 81 to swing about the axis of its pivotal connection 84 to the carriage 56, and it is the purpose of this discussion to show that the nature of this movement is such that the arm 81 swings in true rotary motion about a single point with the hairline 89 at all times extending truly radially with respect to that center.

The picture plane line 123 in Fig. 11 can be assumed, for the purpose of this demonstration, to correspond to the path of the pivot pin 84; whereas, another line 151 parallel thereto and slidable therebelow can be assumed to represent the path of that portion of the head 96 to which the lower end 83 of the arm 81 is connected. For any position of the head and carriage any line drawn from the picture plane line 123 to a central point of rotation, say the station point S, will intersect the lower line 151. Consequently, when the carriage moves a given distance carrying the pin 84 a given distance, say the distance $p$ to $m$ on line 123, the head 96 will move along the line 151 a lesser distance, say the distance $p'$ to $m'$. Similarly, when the carriage moves the distance $n$ to $o$ along the line 123, the head 96 will move the distance $n'$ to $o'$ along the line 151. If corresponding points on these two lines are interconnected by lines 152 which lines are then extended until they intersect, it will be found that these lines actually do intersect at a common point, say the point S. This can be proved geometrically as follows:

Since mutually equiangular triangles are similar, the triangles $pm$S and $p'm'$S are similar.

Since respective sides of similar triangles are proportional $$pm:p'm'=pS:p'S$$

Obviously, however, the triangle $po$S and $p'o'$S are also similar, and since respective sides of similar triangles are proportional $$pS:p'S=oS:o'S$$

Furthermore, the triangles $no$S and $n'o'$S are also similar, and therefore $$no:n'o'=oS:o'S$$

Since values equal to the same thing are equal to each other, it follows that $$pm:p'm'=no:n'o'$$

Or, if segments of unequal length on two parallel lines have their respective ends joined by transverse lines which continue until those transverse lines intersect at an external point, those two segments will bear the same ratio to each other as the ratio between any other two segments on the same parallel lines defined by other transverse lines intersecting at the same external point. It is proved, therefore, that since the ratio of the movement of the carriage 56 to that of the head 96 is constant throughout their entire range of movement, the alignment of the hairline 89 with a given point spaced below the paths of movement of the head and carriage will be preserved, and consequently the drafting machine of the present invention can be relied upon to plot accurately the significant points of a perspective view in accordance with the method hereinabove described.

Because the pivot pin 107 is slidable within the T-slot 109, the distance between the pin 107 and the pin 84 is subject to adjustment, with the result that the distance of the station point below the path of movement of the head 96 and the carriage 56 can be selected, thus making it possible to predetermine the view point or "station point" of the perspective. By virtue of the fact that the two tapes travel in a ratio of 10 to 9, the distance between the picture plane pivot 84 and the station point is ten times the distance between the pivots 84 and 107, thus making for ease in calibration. The calibrations 114 (see Fig. 2) provided upon the upper surface of the head 96 preferably represent the distances of the station point from the picture plane.

Another matter which is subject to a wide range of latitude in accordance with the wishes of the person using the drafting instrument has to do with the angle of vision, i. e. from which side of the object the view being drawn is taken. Before starting to develop the perspective view 124 from the plan view 121, the operator should determine the angularity at which the object is to be viewed before locating the plan view 121 with respect to the station point S, it being remembered that the station point S is fixed so far as distance from either of the lateral edges of the drafting board is concerned since it lies at the intersection of all the radial lines along which the hairline 89 can lie. After having decided on just what view of the object is desired, he then should slide the upper sheet of paper horizontally until the plan view assumes the position with respect to the station point S wherein the actual object viewed at that same angle will present the view desired. The equipment then is in readiness for the operator to start drawing the vertical lines 127, it being understood, of course, that the automatic operation of the machine obviates the necessity of drawing the lines of sight 126.

Considering the mechanism of my drafting machine broadly, it will be seen that the arm 81 constitutes a linearly extensive point-finding element for points in the original views laid out on the upper portion of the drafting area, two longitudinally spaced points of this element having been furnished with pivotal connections to the two differentially traveling belts 51 and 52. The uppermost pivot will be seen to have been connected to the more rapidly traveling belt 52, in this instance to the lower run of said belt; but it will be noted that the pivot connection is at 84, being the upper of the two pivots 84 and 107. And in this embodiment of the invention, the arm, or longitudinally extensive point-finding element, involves a longitudinally extensive hairline 89. Various substitutes for the hairline 89 are possible, however; for instance, in Figs. 13–19 its place is taken by a fine wire, which of course is the equivalent of a hairline, and my claims referring to a hairline embrace all such linear elements. As a still further modification, however, the hairline may be reduced to a point, e. g. a stylus, which is linearly extensive along the same line that is occupied by the hairline in the embodiment of Figs. 1–10. Such a device is shown in Fig. 20, as a variation of the embodiment of Figs. 13–19, and may, of course, be used in connection with the embodiment of Figs. 1–10 if so desired.

The rule 118 with its straightedge 119, which may be considered as a linearly extensive point-determining element (just as the arm 81 with its hairline 89 is treated as a linearly extensive point-finding element) is of course subject to modifications similar to those indicated in the case of the point-finding element.

Figure 12:
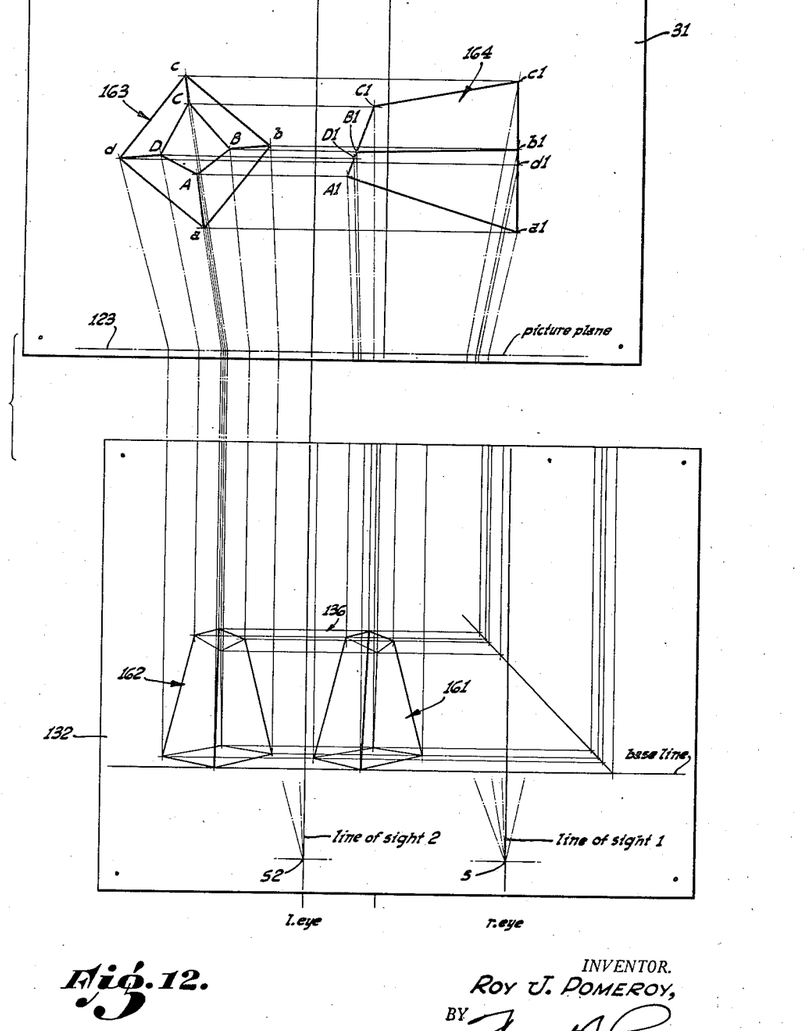
Fig. 12 is a view similar to Fig. 11 but indicating the manner in which the drafting machine of the present invention can be employed to draw a stereoscopic pair of perspective views.
Figure 13:
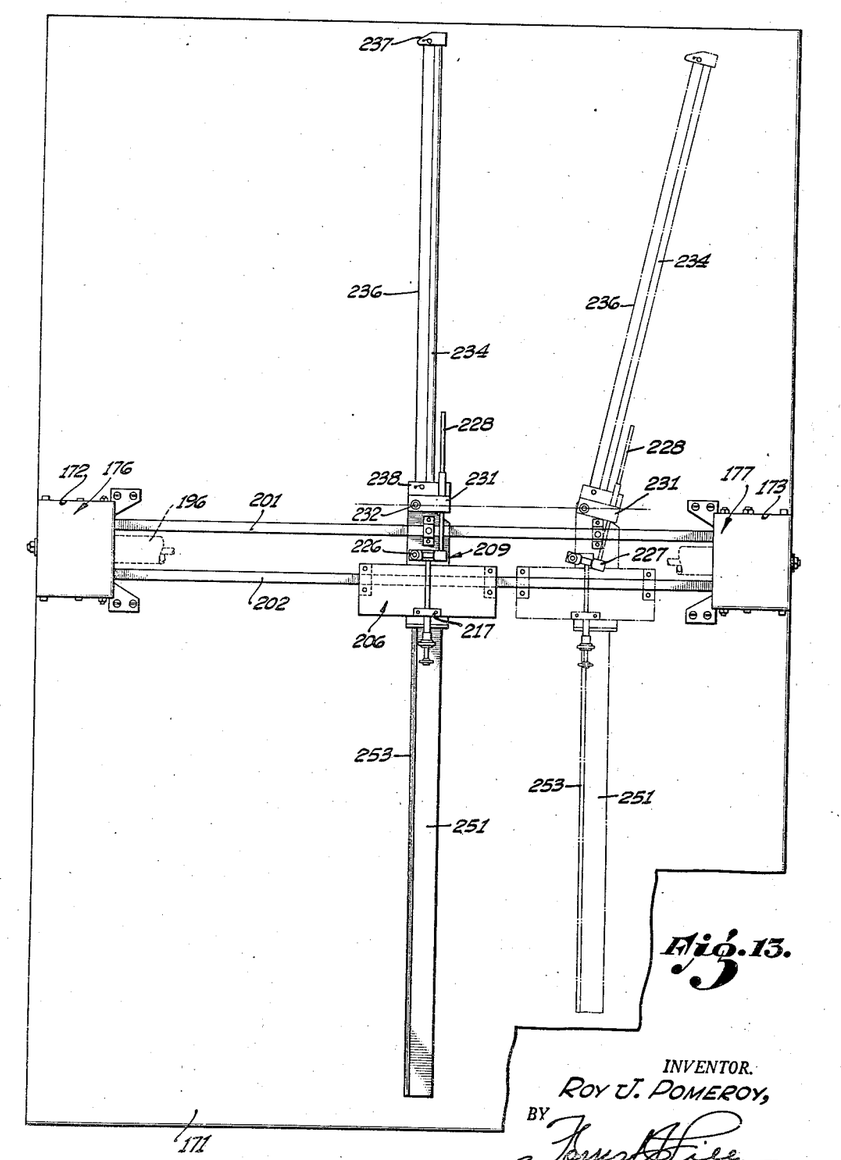
Fig. 13 is a view similar to Fig. 1, but showing a modified form of perspective drafting machine of the present invention.

Fig. 12 indicates another beneficial use to which the drafting machine of the present invention can be placed as the result of the fact that the exact angle of vision can be selected in accordance with requirements of any individual problem, and can also be shifted, so that a second perspective from a different angle of vision can be drawn. Thus two separate perspective views 161 and 162, respectively, in the nature of a "stereoscopic pair" can be constructed from the plan and elevational views 163 and 164.

The preferred method of accomplishing this is as follows:

Following the drawing of the perspective view 161, which is executed in exactly the same manner as heretofore described, the "station point" is shifted. This may be done by releasing the tension in one of the flexible belts 51 and 52, so that both the carriage 56 and head 96 may be shifted laterally without relative movement occurring therebetween. Obviously, this may take place, because if either of the belts slip, the driving connection between the two components 56 and 96 is lost. In the present machine, the belt 51 may be de-tensioned to accomplish the purpose stated by loosening the tension adjusting set screw 104. Throughout any such shifting of the carriage 56 and head 96 laterally, without relative movement occurring therebetween, there will obviously be no pivotal movement of the arm 81. Therefore, with the arm 81 in its perpendicular position, the carriage and head may be shifted as a unit to any lateral position, and the arm 81 will remain in perpendicular position, so that new "station points" may be obtained, it being recalled that the station point for any adjustment will lie along the edge 119 of arm 118 when the arm 81 is in perpendicular position.

Accordingly, to construct the second member of a "stereoscopic pair" of perspective views, the belt 51 is loosened, and carriage 56 and head 96 shifted laterally toward the left until hairline 89 of arm 82 coincides with the new line of sight number "2." The distance of shift is based on the interpupillary distance, which is ordinarily about 65 mm. If the scale of the drawing is to be unity, the distance of lateral shift will accordingly be 65 mm. However, if the scale is to be increased or decreased, the distance of shift is increased or decreased proportionately to the scale. The lower sheet of paper 132 may at this time be shifted laterally to the right to provide for the correct viewing distance between the two views, as determined by the type of stereoscopic vewing device to be used.

The sheet 132 is illustrated as so shifted in Fig. 12; compare with Fig. 11. The second perspective view 162 may then be drawn, working from plan view 163 in the normal way, and securing elevations by projecting across from perspective view 161. A pair of perspective views 161 and 162 prepared as thus described may be viewed stereoscopically to show the figure in third dimension. By this simple procedure, accurately depicted stereoscopic pairs of highly complicated objects may be drawn, and such complicated objects may thus be readily studied or explained in many cases in which an ordinary simple perspective would not readily reveal sufficient detail that the objects might otherwise be understood.

Figs. 13 to 19 illustrate a slightly modified form of the perspective drafting machine of my invention which, however, is adapted for use in the same manner and to accomplish identically the same purposes as my previously described machine. In this modification a relatively large drawing board 171 has opposed notches 172 and 173 formed in lateral alignment with each other in the two lateral edges to receive anchoring blocks 176 and 177, respectively. Within these anchoring blocks, pulley supporting shafts 178 and 179, respectively, are mounted, these shafts lying in the plane of the drafting board 171 and parallel to the lateral edges thereof. One of these shafts, say the shaft 179, is revolubly mounted, for which purpose aligned anti-friction bearings 181 are provided in the side plates 182 of the associated anchoring block 177. Rigidly secured to the shaft 179 are upper and lower driver pulleys 186 and 187 of different diameters, the upper in this instance having the greater diameter, and the ratio of the two again preferably being 10 to 9. In the other anchoring block 176, the shaft 178 may be rigidly mounted as by having its ends fitted in complementary sockets, since the two pulley wheels 188 and 189 thereon preferably are individually journaled on the shaft 178 as by anti-friction bearings 191. Preferably, though not necessarily, the idler pulleys 188 and 189 also are of different radius, with their diameters bearing the same relationship to each other as in the driver pulleys 186 and 187.

A spacer tube 196 is under compression between the anchoring blocks 176 and 177; and a tie bolt 197 within the tube 196 so interconnects the two blocks 176 and 177 that when nuts 198 on the ends of the bolt 197 are tightened, the blocks 176 and 177 are pressed firmly against the ends of the tube.

Also extending between the two anchoring blocks 176 and 177 are two unstretchable flexible belts 201 and 202, preferably steel tapes, interconnecting corresponding pulleys at the two sides of the drafting board, i. e., the tape 201 extends around the two larger upper pulleys 186 and 188, whereas the other tape 202 extends around the two smaller lower pulleys 187 and 189. Due to the difference in the diameters of the two pulleys 186 and 187 which are rigidly interconnected, any movement of the lower tape 202 on the smaller pulley 187 will result in movement of the upper tape 201 in the same direction but through a greater distance. Moreover, as in the previously described modification, the ratio between the movements or rates of travel of the two tapes 202 and 201 remains constant throughout their entire range of movement.

In this modification the head 206 is connected to the lower (slower) tape 202 which is associated with the smaller pulley 187, a clamping screw 207 threaded through a suitable bracket 208 on the carriage 206 being employed for this purpose. In a similar fashion, the carriage 209 is clamped as by a screw 211 to the upper (faster) tape 201 which passes around the larger pulley 186. Consequently, when the carriage head moves laterally with respect to the drawing board 171, the carriage 209 must move in the same direction and through a greater distance as determined by the ratio between the diameters of the pulleys 187 and 186.

Figure 14:
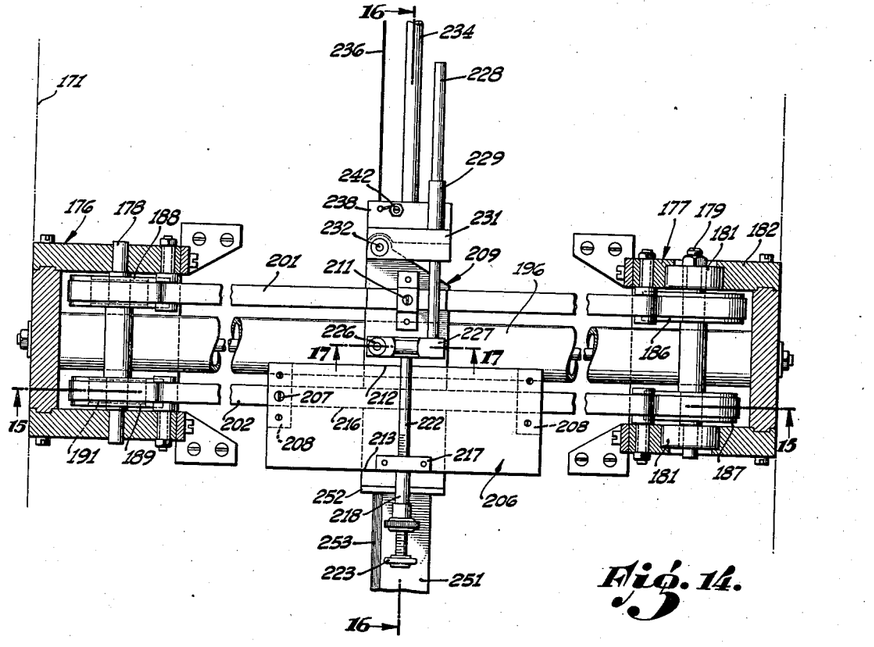
Fig. 14 is an enlarged top plan view of the essential mechanism of the drafting machine of Fig. 13, portions of the figure being broken away to reduce its size.
Figure 15:
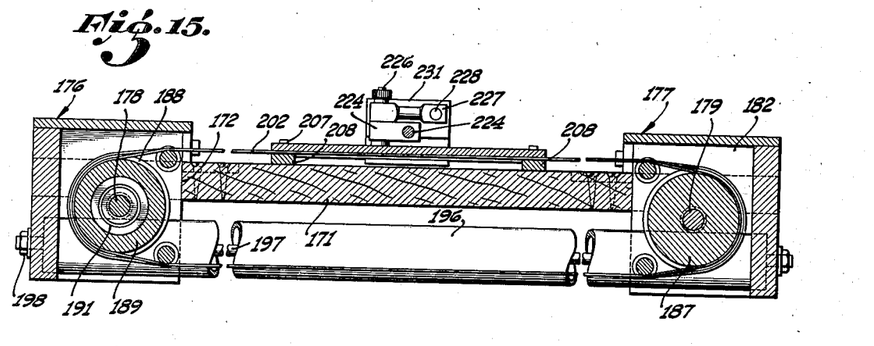
Fig. 15 is a transverse vertical sectional view taken upon the line 15—15 of Fig. 14 with the direction of view as indicated. Portions of this figure also are broken away to reduce its size.
Figure 16:
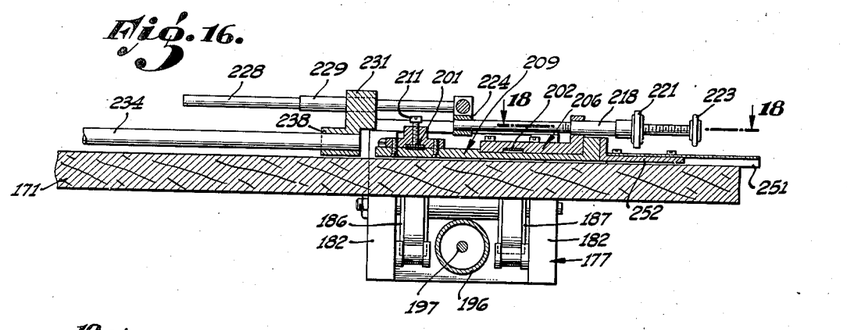
Fig. 16 is a longitudinal vertical sectional view taken upon the line 16—16 of Fig. 14 with the direction of view as indicated.
Figure 17:
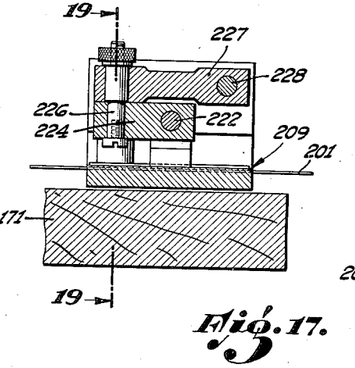
Fig. 17 is a more highly enlarged detail view in transverse vertical section taken upon the line 17—17 of Fig. 14 with the direction of view as indicated.
Figure 18:
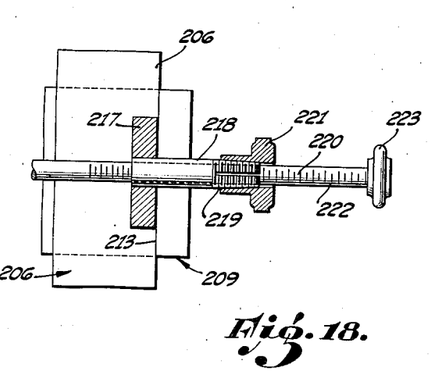
Fig. 18 is a detail view in horizontal section taken on the line 18—18 of Fig. 16 with the direction of view as indicated.
Figure 19:
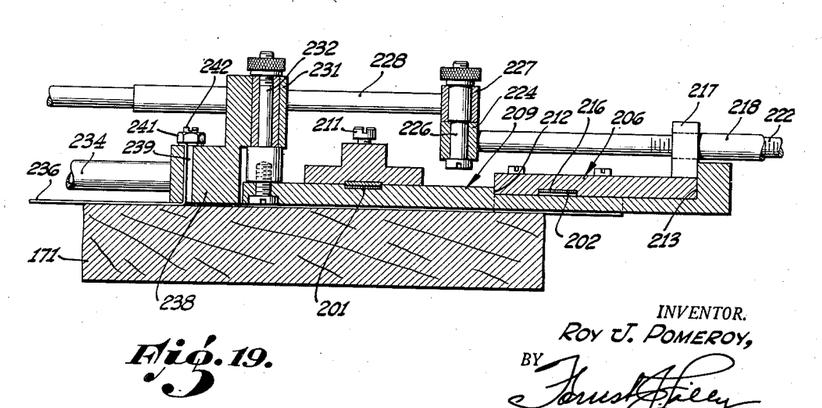
Fig. 19 is a detail view in longitudinal vertical section taken on the line 19—19 of Fig. 17 with the direction of view as indicated.
Figure 20:
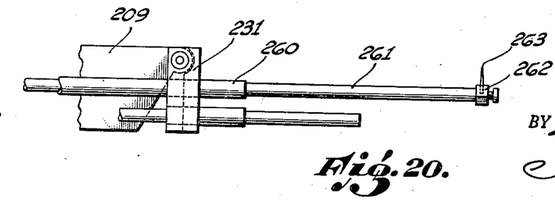
Fig. 20 is a fragmentary plan view of a modified point-finding element.

Comparison of Fig. 14 with Figs. 16 and 19 will reveal that in this modification the carriage 209 takes the form of a plate relatively elongated in the direction extending longitudinally of the drafting board, whereas the head 206 comprises a plate of materially greater width than the carriage 209. The head 206 rests upon the upper surface of the carriage 209, preferably being guided for accurate transverse movement with respect thereto by being slidably engaged between the upper and lower shoulders 212 and 213, respectively, in the upper surface of the carriage 209. Since the two tapes 201 and 202 are spaced apart from each other in a direction extending longitudinally of the drafting board 177, and since both tapes can be stretched very tightly, a highly rigid structure is developed which permits facile movement of the head 206 and carriage 209 laterally of the drafting board 171. The structure can be relied upon to guide the two members 206 and 209 in straight line movement with great accuracy, thus avoiding the necessity of providing additional rigid guides. The tape 202 fits within a groove 216 in the under surface of the head 206. So nicely does the tape fit within this groove 216 that side play of the head with respect to the tape is prevented, which feature taken in connection with the relatively great width of the head 206 and the correspondingly relatively great length of the tape 202 which is engaged therewith, further enhances the rigidity of the structure.

Rigidly secured upon the head 206, as by means of a suitable mounting block 217, is a guide tube 218 extending in a direction perpendicular to the tapes 201 and 202. The lower end of the tube 218 is split and is provided with an external tapered thread 219 upon which a suitable thumb nut 221 is engaged. This nut 221 may be tightened upon its thread 219 so as to lock a rod 222 having calibrations 220 in selected position with respect to the guide tube 218 through which the rod 222 slidably extends. A knob 223 on the lower end of the rod 222 facilitates longitudinal adjustment of the rod 222 within the tube 218 when the nut 221 is loosened. Rigidly secured upon the upper end of the rod 222 is a block 224 which extends a short distance to one side of the rod 222. (See Fig. 17.) The block 224 carries a vertical pivot pin 226, upon the upper end of which a laterally extending bar 227 is pivotally supported. Adjacent the end of the bar 227 remote from the pivot pin 226 a rod 228 is rigidly secured, and this rod 228 extends upwards and through a guide tube 229, the support for which is a laterally extending bar 231. A vertical pivot pin 232 rigid with the carriage 209 pivotally supports the bar 231, the pivot pin 232 engaging the bar 231 adjacent the end thereof which is remote from its end that carries the guide tube 229.

As in the previously described modification, the carriage 209 also carries an arm provided with a hairline accurately in radial alignment with the axis of the pivotal connection of the arm to the carriage. In this instance, however, the arm and hairline also are of modified form, the former being preferably a rigid tube 234 carried by an offset portion 238 of the pivotally mounted bar 231, and the latter taking the form of a length of fine piano wire 236 stretched tightly between a head 237 on the outer or upper end of the tube 234 and said offset portion 238. This offset portion 238 is of such form that its under surface is spaced only slightly above the upper surface of the drawing board 171 so that the piano wire 236, which is secured to the offset portion 238 by extending through a vertical hole 239 therein, closely overlies the upper surface of the drawing board 171, as clearly illustrated in Fig. 10. The upper end of the portion of piano wire 236 which passes through the hole 239 is anchored to the bar 231 by means of a nut 241 threadedly engaged upon a stud 242 or the like on the upper surface of the offset portion 238 of the bar 231. A rule 251 is rigidly secured to the lower end of the carriage 209 as by an angle bracket 252. One edge 253 of the rule 251 which preferably is bevelled is accurately in alignment with the axis of the pivot pin 232 whereby the hairline-carrying arm 234 is pivoted to the carriage.

The manner of operation of this modification of my drafting machine is the same as in the case of the previously described embodiment. Since the carriage 209 upon which the hairline-carrying arm 234 is pivoted is connected to the tape 201 associated with the larger pulleys, and since the head 206 upon which the pivot pin 226 for the rod 228 which slidably engages the hairline-carrying arm 234 is connected to the other tape 202, which moves at a slower rate than the tape 201, any movement of the carriage 209 will be accompanied by movement of the pivot pin 226 but at a lesser rate. Say, for example, the carriage 209 moves to the right as viewed on Figs. 13 and 14. As stated, this movement will be accompanied by similar movement of the pivot pin 226, but at a lesser rate and, therefore, the rod 228 is forced to assume a position of obliquity as indicated in broken lines in Fig. 13. When thus moving to an oblique position, the rod 228, since it is slidably fitted within the guide tube 229, will impart similar obliquity to the bar 231 and the hairline-carrying arm 234 rigid therewith. Consequently, it may be seen that the action of the hairline-carrying arm in this modification is precisely the same as that of the transparent arm 89 in the previously described embodiment. Therefore, after the apparatus has been shifted so as to make the piano wire 236 register with a given significant point on one of the plan views, the rule 251 can be relied upon to serve as a straight-edge along the edge 253 of which a vertical line can be drawn to indicate the proper position between the longitudinal edges of the drawing board for the corresponding point in the perspective view being constructed.

Considering the mechanism of Figs. 13–19 in a broad sense, it will be evident that, as in the mechanism of Figs. 1–10, there is a linearly extensive point finding element having two pivot connections to the two belts. In effect, the tube 234 carrying the hairline, or fine wire 236, and the rod 228, constitute an arm having the two effective pivot connections 232 and 226 to the belts 201 and 202, respectively, and this arm I refer to broadly as a linearly extensive point-finding element. The effective arm length furnished by the rod 228, and hence the relative speeds of travel of the carriage and head, is of course variable through longitudinal adjustment of the rod 222, as aforesaid. As previously brought out, this adjustment determines the distance between the picture plane (transverse plane through pivot 232) and the station point about which the hairline 236 will rotate.

Fig. 20 shows a modified form of linearly extensive point-finding element, in which the linear hairline is substituted for by a point or stylus which is extensive along the line of the hairline. The bar 231 pivoted at 232 to the carriage 209 in this instance carries a guide tube 260 which telescopically receives a linearly extensive tubular arm 261 carrying at its end a stylus 262 whose point 263 is closely spaced to the drawing sheet, and traces along the line of the hairline of the earlier described embodiments when the arm 261 is extended or retracted. Thus, with this embodiment, instead of aligning a hairline with significant points of the views depicted in plan and elevation on the upper portion of the drawing area, the arm 261 is pulled out to the proper extension that the stylus will coincide with each such point in turn. And of course a similar modification is possible in the case of the straightedge 251. This stylus type of linearly extensive point finding or determining element has particular application in certain modified forms of my invention to be disclosed in subsequent applications, but is disclosed here to indicate partially the range of equivalent forms that are contemplated as falling within the expressions linearly extensive point-finding or point-determining elements.

I have now disclosed certain present illustrative embodiments of my invention in considerable detail. It will, of course, be understood that this is for illustrative purposes only, since various changes in design, structure and arrangement may be made without departing from the spirit and scope of the invention or of the appended claims.

I claim:

1. Apparatus for making perspective drawings comprising a base defining a drawing area, a linearly extensive point-finding element overlying an upper portion of said drawing area, differentially operable means connected to longitudinally spaced points of said linearly extensive element adapted to move said points transversely across a medial portion of said drawing area in parallel paths in the same direction at a predetermined speed ratio whereby said point-finding element is swept angularly over said upper portion of said drawing area, and a linearly extensive perspective view point-determining element carried with one of said spaced points and lying in a line extending over the lower portion of the drawing area in a direction perpendicular to said parallel paths.

2. Apparatus for making perspective drawings comprising a base defining a drawing area, a linearly extensive point-finding element overlying an upper portion of said drawing area, differentially operable means connected to longitudinally spaced portions of said linearly extensive element adapted to move said portions transversely across a medial portion of said drawing area in parallel paths in the same direction at a predetermined speed ratio, other than unity and in such arrangement that the uppermost of said portions travels at a faster rate than the lowermost of said portions, whereby said point-finding element is swept angularly over said upper portion of said drawing area, and a linearly extensive perspective view point-determining element carried with the uppermost of said spaced portions and lying in a line extending over the lower portion of the drawing area in a direction perpendicular to said parallel paths.

3. Apparatus for making perspective drawings comprising a base defining a drawing area, a linearly extensive point-finding element overlying an upper portion of said drawing area, means for carrying and swinging said element about a predetermined center embodying a pair of flexible endless belts having runs extending parallel to one another across a medial portion of said drawing area, means pivotally connecting longitudinally spaced portions of said linearly extensive element one to one of said runs and the other to the other of said runs, and means interconnecting said belt runs for movement in the same direction at a predetermined speed ratio embodying a pair of interconnected pulleys of differential diameters, one engaging one of the belts and the other engaging the other of the belts, and a linearly extensive point-determining element carried with one of said spaced portions and lying in a line extending over the lower portion of said drawing area in a direction perpendicular to the paths of movement of said belt runs.

4. Apparatus for making perspective drawings comprising a base defining a drawing area, a linearly extensive point-finding element overlying an upper portion of said drawing area, a pair of flexible belts having horizontal runs extending parallel to one another transversely across said drawing area, means mounting and constraining said belts to travel at a predetermined speed ratio other than unity, means pivotally connecting two longitudinally spaced portions of said linearly extensive element to said belt runs, the uppermost of said portions to the faster travelling belt run, and the lowermost of said portions to the slower travelling belt run, and a linearly extensive point-determining element carried with the uppermost of said spaced portions and lying in a line extending over the lower portion of said drawing area in a direction perpendicular to the paths of movement of said belt runs.

5. Apparatus for making perspective drawings comprising a base defining a drawing area, a linearly extensive point-finding element overlying an upper portion of said drawing area, a pair of endless belts having parallel horizontal runs extending transversely across a medial portion of the drawing area, one above the other, means mounting and constraining said belts for travel at a predetermined speed ratio other than unity, means pivotally connecting two longitudinally spaced portions of said linearly extensive element to said belt runs, the uppermost of said portions to the faster travelling belt run, and the lowermost of said portions to the slower travelling belt run, and a linearly extensive point-determining element carried with the uppermost of said spaced portions and lying in a line extending over the lower portion of said drawing area in a direction perpendicular to the paths of movement of said belt runs.

6. Apparatus for making perspective drawings embodying a base defining a drawing area, arm means overlying a portion of said drawing area and adapted to be angularly swung about a predetermined center point, means for so swinging said arm means comprising means pivotally engaging two longitudinally spaced points of said arm means and operable to move said points transversely across said drawing area at rates of travel bearing a predetermined constant ratio to one another, and a second arm means carried with one of said points and extending in a direction always at right angles to the direction of travel of said point.

7. Drawing apparatus of the character described comprising a base defining a drawing area, pairs of axially aligned pulleys journaled on axes perpendicular to the drawing area adjacent the two lateral edges of said drawing area, and intermediate upper and lower portions of said area, the pulleys of at least one of said pairs being interconnected for simultaneous rotation and having differing radii, a pair of flexible endless belts each engaged upon one pulley of each of said pairs, in such manner as to provide belt runs extending over said base transversely of the drawing area between corresponding pulleys of the two said pairs, an arm means movable over the upper portion of the drawing area, and means pivotally connecting two longitudinally spaced portions of said arm means to two of said belt runs that travel in the same direction, the upper of said portions, to the one of said runs associated with the pulley of larger radius, and the lower of said portions, to the belt run associated with the pulley of lesser radius.

8. Drawing apparatus of the character described comprising a drawing board, pairs of pulleys journaled adjacent the two lateral edges of said board on axes parallel to the surface of said board and parallel to the lateral edges thereof, the pulleys of at least one of said pairs being interconnected for simultaneous rotation and having differing radii, a pair of flexible belts, each engaged upon one pulley of each of said pairs, and having one run extending transversely across above the drawing board and one run extending transversely across beneath the drawing board, an arm means, and means pivotally connecting longitudinally spaced portions of said arm means to the two belt runs that are above the drawing board, the upper of said portions to the one of said runs associated with the pulley of larger radius, and the lower of said portions to the belt run associated with the pulley of lesser radius.

9. Apparatus for making perspective drawings comprising means defining a drawing area, a carriage movable with respect thereto in a predetermined path, means carrying a hairline pivotally mounted on said carriage and extending therefrom over a portion of said drawing area to one side of said predetermined path, a straightedge rigid with said carriage and extending over another portion of said drawing area in a direction perpendicular to said predetermined path, and means operable as said carriage moves along said path for moving said hairline-carrying means in a rotary motion about the axis of its pivotal mounting at a rate bearing a predetermined relationship to the rate of movement of said carriage.

10. Apparatus for making perspective drawings comprising means defining a drawing area, a carriage movable with respect thereto in a predetermined path, means carrying a hairline pivotally mounted on said carriage and extending therefrom over a portion of said drawing area to one side of said predetermined path, a straightedge rigid with said carriage and extending over another portion of said drawing area in a direction perpendicular to said predetermined path, means operable as said carriage moves along said path for moving said hairline-carrying means in rotary motion about the axis of its pivotal mounting at a rate bearing a predetermined relationship to the rate of movement of said carriage, and adjustment means for varying the ratio of said rates to each other.

11. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, means pivotally connecting said hairline-carrying means to said carriage, means pivotally connecting said hairline-carrying means to said head at a pivot point spaced from the pivotal connection of the hairline-carrying means with the carriage, and means interconnecting said head and carriage for moving said head with respect to said carriage through a distance bearing a predetermined constant relationship to the distance through which said carriage moves.

12. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, means pivotally connecting said hairline-carrying means to said carriage, means pivotally connecting said hairline-carrying means to said head at a pivot point spaced from the pivotal connection of the hairline carrying means with the carriage, means interconnecting said head and carriage for moving said head with respect to said carriage through a distance bearing a constant relationship to the distance through which said carriage moves, and a straightedge rigid with said carriage extending perpendicular to the path of movement thereof.

13. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, a pair of pivots spaced apart in the direction of said hairline and pivotally connecting said carrying means respectively to said carriage and to said head, one of said pivots being adjustably arranged for variance of the distance between said pair of pivots, means interconnecting said head and carriage for moving said head when said carriage moves, in such manner that the ratio of movements of said head and said carriage remain constant throughout their entire range of movement, and a straightedge mounted rigidly upon said carriage with its working edge perpendicular to the path of movement thereof.

14. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, a pin pivotally connecting said carrying means to said carriage, a second pin slidably engaged within a slot extending transversely of said head and within a slot in said carrying means, means for fastening said second pin in selected position within one of said slots, and differential driving means actuated by said carriage during movement thereof for moving said head at a rate bearing a constant relationship to that of said carriage.

15. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, a pin pivotally connecting said carrying means to said carriage, a second pin extending through a slot in said carrying means, a head on said second pin slidably seated within a T-slot extending transversely of said head, a nut threaded on said pin, a bushing on said pin and slidably disposed within said slot in said carrying means, said bushing being longer than the thickness of the associated portion of said carrying means whereby tightening of said nut operates to fasten said head in selected position within said T-slot without tightening said carrying means with respect thereto, and differential driving means actuated by said carriage during movement thereof for moving said head at a rate bearing a constant relationship to that of said carriage.

16. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, a pair of pivots spaced apart in the direction of said hairline and pivotally connecting said carrying means respectively to said carriage and to said head, and differential driving means actuated by said carriage during movement thereof for moving said head at a rate bearing a constant relationship to that of said carriage.

17. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, a pair of pivots spaced apart in the direction of said hairline and pivotally connecting said carrying means respectively to said carriage and to said head, a pair of axially aligned pulleys adjacent each end of said carriage-mounting means and journaled for rotation about an axis fixed with respect thereto, the pulleys of at least one of said pairs being of different radius from each other and being interconnected for rotation together, flexible belts engaged upon and interconnecting corresponding pulleys of both of said pairs, and means associated with each of said belts for connecting them respectively to said carriage and to said head.

18. Drawing apparatus of the character described comprising a drawing board, a pair of transversely separated anchoring blocks rigid therewith, a guide rod rigid with and interconnecting said anchoring blocks, a pair of axially aligned pulleys journaled on each of said anchoring blocks, said pulleys of at least one of said pairs being of different radius and being interconnected for simultaneous and coextensive rotation, flexible belts engaged upon and interconnecting the larger and smaller pulleys, respectively, of both of said pairs, a carriage slidably engaged on said guide rod, a head slidably engaged upon said guide rod independently of said carriage for movement parallel to the belt runs between said pulleys, means clamping one of the runs of said belt on said larger pulleys to said carriage for coextensive movement therewith, means clamping said head to the corresponding run of the other of said belts, an arm pivoted intermediate its ends to said carriage and extending therefrom over the upper portion of said drawing board, the lower end of said arm overlying a portion of said carriage and having a longitudinal slot therein, a pin rigid with said head and extending through said slot whereby said lower end of said arm is moved in the same direction as said carriage when said carriage is moved but at a slower rate, and a straightedge rigid with said carriage and extending therefrom over the lower portion of said drawing board with its working edge perpendicular to said guide rod.

19. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, means pivotally connecting said carrying means to said carriage, a rod parallel to said hairline and connected to said carriage for axial movement with respect thereto, means pivotally connecting said rod to said head, and differential driving means actuated by said carriage during movement thereof for moving said head at a rate bearing a constant relationship to that of said carriage.

20. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, means pivotally connecting said carrying means to said carriage, a rod parallel to said hairline and connected to said carriage for axial movement with respect thereto, means pivotally connecting said rod to said head, at least one of said pivotally connecting means being adjustably arranged for variance of the distance between them, releasable means for locking said adjustable connecting means in selected position, and differential driving means actuated by said carriage during movement thereof for moving said head at a rate bearing a constant relationship to that of said carriage.

21. Apparatus for making perspective drawings comprising a carriage, means mounting said carriage for straight line, reciprocatory movement, a head cooperatively associated with said carriage and mounted for reciprocatory movement with respect thereto and parallel to that of said carriage, means carrying a hairline extending from said carriage in an angular direction with respect to the path of said straight line movement, means pivotally connecting said carrying means to said carriage for rotary movement about an axis with respect to which said hairline is radially disposed, a rod parallel to said hairline and connected to said carriage for axial movement with respect thereto, means pivotally connecting said rod to said head, said rod being laterally offset to the same side of and the same distance from both of said pivotally connecting means, at least one of said pivotally connecting means being adjustably arranged for variance of the distance between them, releasable means for locking said adjustable connecting means in selected position, and differential driving means actuated by said carriage during movement thereof for moving said head at a rate bearing a constant relationship to that of said carriage.

22. Apparatus for making perspective drawings comprising a base defining a drawing area, a linearly extensive point-finding element overlying an upper portion of said drawing area, means for carrying and swinging said element about a predetermined center point including a pair of means operatively engaging and adapted to move two longitudinally spaced portions of said element in parallel horizontal paths transversely across said drawing area at a predetermined speed ratio, with the uppermost of said points travelling at the greater speed, the length of said element included between points of engagement with said pair of means being extensible and contractible as said element swings from and toward a vertical position, and a vertically arranged linearly extensive perspective view point-determining element carried in transverse horizontal travel across said drawing area with the uppermost of said spaced portions of said point-finding element.

23. Apparatus for making perspective drawings comprising a base defining a drawing area, a linearly extensive point-finding element overlying an upper portion of said drawing area, a pair of flexible belts having horizontal runs extending parallel to one another transversely across said drawing area, means mounting and constraining said belts to travel at a predetermined speed ratio other than unity, two spaced pivot means pivotally connecting two longitudinally spaced portions of the lower section of said element to said belt runs, the uppermost of said portions to the faster travelling belt run, and the lowermost of said portions to the slower travelling belt run, said element being arranged for extension and contraction of that portion of its length included between said pivot means with movement of said element from and toward a vertical position, and a vertically arranged linearly extensive perspective view point-determining element carried in transverse horizontal travel across said drawing area with the uppermost of said spaced portions of said point-finding element.

24. Apparatus for making perspective drawings comprising a base defining a drawing area, a linearly extensive point-finding element overlying an upper portion of said drawing area, a pair of flexible belts having horizontal runs extending parallel to one another transversely across said drawing area, means mounting and constraining said belts to travel at a predetermined speed ratio other than unity, means furnishing a pivot connection for a point on said element to one of said belt runs, means furnishing a longitudinal slide-pivotal connection for a portion of said element longitudinally spaced from the first-mentioned belt connected point, to the other of said belt runs, the uppermost of said connections being made to the faster travelling belt run, and a vertically arranged linearly extensive perspective view point-determining element carried in transverse horizontal travel with the faster travelling belt run.

25. Apparatus for making perspective drawings comprising a base defining a drawing area, a linearly extensive point-finding element overlying an upper portion of said drawing area, a pair of flexible belts having horizontal runs extending parallel to one another transversely across said drawing area, means mounting and constraining said belts to travel at a predetermined speed ratio other than unity, two spaced pivots pivotally connecting two longitudinally spaced points of the lower section of said element to said belt runs, the uppermost of said points to the faster travelling belt run, and the lowermost of said points to the slower travelling belt run, telescoping means in said element between said pivotally connected points, and a vertically arranged linearly extensive perspective view point-determining element carried in transverse horizontal travel with the faster travelling belt run.

ROY J. POMEROY.